United States Patent [19]
Sato

[11] Patent Number: 5,095,776
[45] Date of Patent: Mar. 17, 1992

[54] SYSTEM FOR CONTROLLING A CONTINUOUSLY VARIABLE TRANSMISSION HAVING A TORQUE CONVERTER

[75] Inventor: Keiji Sato, Tokyo, Japan

[73] Assignee: Fuji Jukogyo Kabushiki Kaisha, Tokyo, Japan

[21] Appl. No.: 604,135

[22] Filed: Oct. 29, 1990

[30] Foreign Application Priority Data

Nov. 30, 1989 [JP] Japan .................. 1-311606

[51] Int. Cl.⁵ .................. B60K 41/28; B60K 41/12
[52] U.S. Cl. .................. 74/890; 74/867;
192/3.31; 192/0.92; 475/65
[58] Field of Search .......... 74/866, 867, 890;
192/0.55, 3.31, 0.91; 475/65

[56] References Cited

U.S. PATENT DOCUMENTS

| | | | |
|---|---|---|---|
| 4,478,322 | 10/1984 | Carlson et al. | 192/0.55 |
| 4,522,086 | 6/1985 | Haley | 74/867 |
| 4,733,582 | 3/1988 | Eggert et al. | 74/867 |
| 4,768,632 | 9/1988 | Moan | 74/890 X |
| 4,782,934 | 11/1988 | Takano et al. | 192/0.92 X |
| 4,790,216 | 12/1988 | Eggert et al. | 74/866 |
| 4,843,918 | 7/1989 | Morimoto | 74/866 |
| 4,898,050 | 2/1990 | Sakai | 74/867 |
| 4,909,103 | 3/1990 | Morimoto | 74/866 |

FOREIGN PATENT DOCUMENTS 63-192629  8/1988  Japan .

Primary Examiner—Leslie A. Braun
Assistant Examiner—Daniel Wittels
Attorney, Agent, or Firm—Beveridge, DeGrandi & Weilacher

[57] ABSTRACT

A continuously variable belt drive transmission has a torque converter with a lockup clutch. The lockup clutch is engaged in accordance with driving conditions of the torque converter. Quantity of downshifting the transmission is decided in dependency on changing rate of speed of an input member of the transmission so that the speed of the input member coincides with speed of the engine. The transmission is downshifted by the downshift quantity and the lockup clutch is engaged so as to change the engine speed at a substantially constant rate.

7 Claims, 6 Drawing Sheets

SYSTEM FOR CONTROLLING A CONTINUOUSLY VARIABLE TRANSMISSION HAVING A TORQUE CONVERTER

BACKGROUND OF THE INVENTION

The present invention relates to a hydraulic control system for a continuously variable belt-drive automatic transmission for a motor vehicle, and more particularly to a system for controlling a continuously variable transmission having a torque converter with a lockup clutch.

A continuously variable transmission having a torque converter with a lockup clutch is known. The torque converter operates to multiply the torque of an engine, so that the vehicle can be smoothly started. After the vehicle starts, the torque converter is preferably locked up by a lockup system, thereby preventing a loss of power and improving fuel consumption. Thus, various control systems for controlling the lockup clutch have been proposed in order to effectively use such characteristics.

In order to quickly engage the lockup clutch, the lockup system starts to engage the lockup clutch at an early stage where there is still a difference between speeds of the input and the output members of the clutch. Thus, the engine speed suddenly changes, thereby causing a shock.

Accordingly, there has been proposed systems for reducing the shock. Japanese Patent Application Laid-Open 63-192629 discloses a system for controlling a continuously variable transmission wherein the transmission is downshifted at the lockup of the torque converter so that the rotational speed of the output member of the clutch is increased. Thus, the speed difference between the input member and the output member is decreased so that the shock at the lockup is reduced.

However, when the transmission is downshifted, the drive pulley speed, that is the speed of the output member of the clutch is rapidly increased and exceeds the engine speed at the lockup. Hence the engine torque and the acceleration characteristics after the lockup largely change compared with that of before the lockup, which causes an even greater shock. Thus, it is desirable to gradually converge the drive pulley speed to the engine speed at the lockup of the torque converter so that the engine speed and the engine torque may smoothly increase.

SUMMARY OF THE INVENTION

The object of the present invention is to provide a system for controlling a continuously variable transmission where a transmission ratio is controlled to maintain a changing rate of engine speed constant so as to reduce shock which occurs when a lockup clutch is engaged.

According to the present invention, there is provided a system for controlling a belt-drive continuously variable transmission for transmitting power of the engine to wheels of a vehicle, the system having a hydraulic circuit including a transmission ratio control valve, and the transmission having a torque converter with a lockup clutch, the system comprising the transmission ratio control valve provided to be operated in accordance with driving conditions of the vehicle, for controlling transmission ratio of the transmission, a control valve provided to be operated in accordance with driving conditions of the vehicle, for controlling oil supplied to the transmission ratio control valve to change the transmission ratio, a lockup control valve provided to be operated in accordance with driving conditions of the vehicle to engage the lockup clutch, deciding means for producing a lockup signal in accordance with the condition of the torque converter for engaging of the lockup clutch.

Downshifting quantity is decided in dependency on speed changing rate of an input member of the transmission so that the input member speed coincides with the engine speed. In response to the lockup signal the control valve and the lockup control valve are operated downshifting the transmission by the downshift quantity and for engaging the lockup clutch so as to change the engine speed at a substantially constant rate.

In an aspect of the invention, the deciding means produces the lockup signal when speed ratio of an output member of the torque converter to an input member becomes larger than a predetermined value.

The other objects and features of this invention will become understood from the following description with reference to the accompanying drawings.

DETAILED DESCRIPTION OF THE PREFERRED EMBODIMENTS

Figure 1:
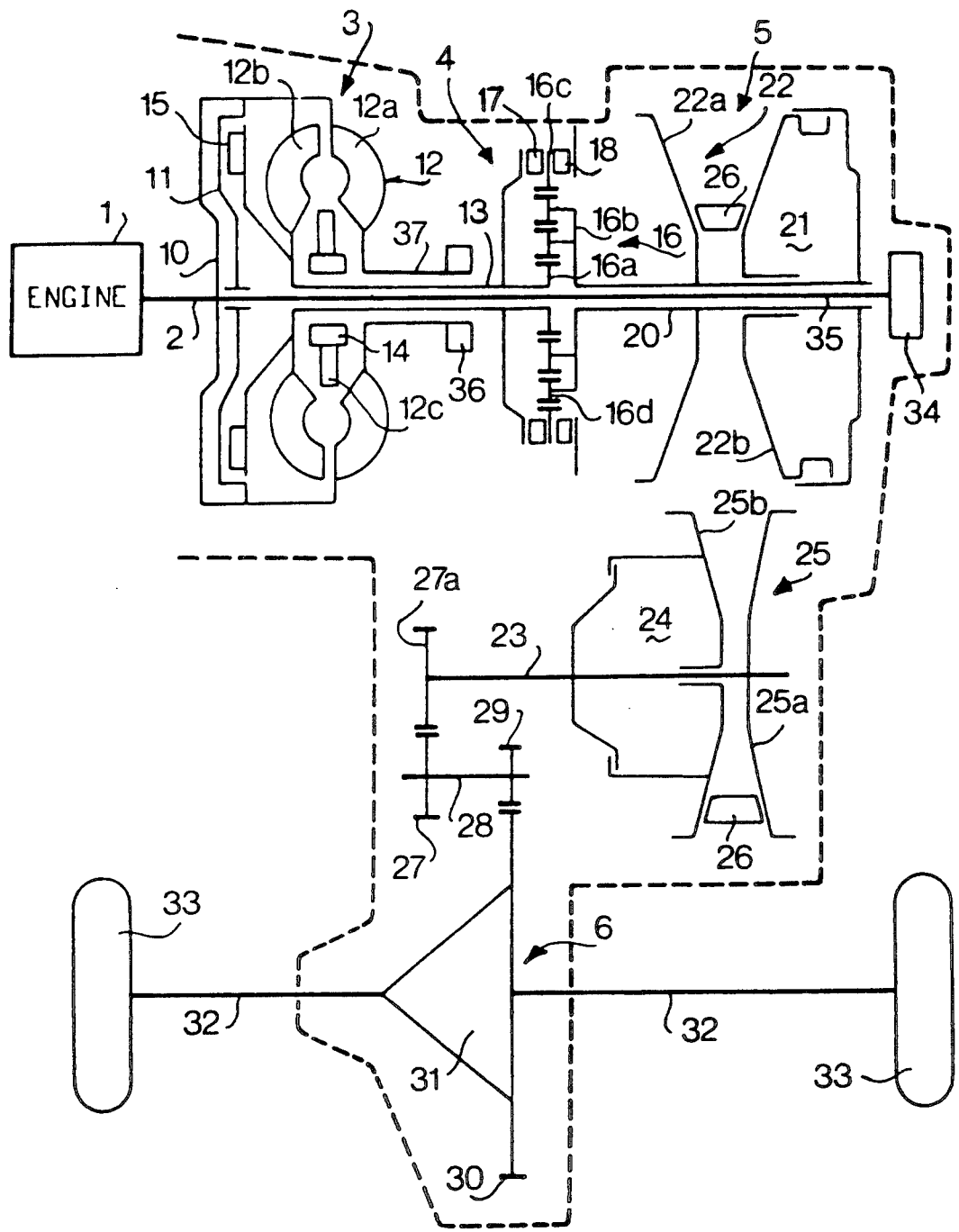
FIG. 1 shows a schematic diagram of a continuously variable belt-drive transmission to which the present invention is applied.

FIG. 1 shows a four-wheel drive power transmission system with a continuously variable belt-drive automatic transmission for a motor vehicle, to which the present invention is applied. An engine 1 is mounted on a motor vehicle at a front portion thereof. The power transmission system comprises a torque converter device 3, a selector device 4, a continuously variable belt-drive transmission 5, and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11 by welding, a turbine 12b connected to an input shaft 13, and a stator 12c connected to a one-way clutch 14. The lockup clutch 15 is disposed between the converter cover 11 and the torque converter 12 for making a contact with the cover 11.

The selector device 4 comprises a planetary gear 16 having a pair of pinions 16d, and a sun gear 16a mounted on the input shaft 13. Pinions 16d are supported on a carrier 16b. The sun gear 16a is engaged with a ring gear 16c through pinions 16d. A forward clutch 17 is disposed between the sun gear 16a and the ring gear 16c. A reverse brake 18 is disposed between the ring gear 16c and a main case At forward driving such as a drive range (D) selection, the forward clutch 17 is engaged to lock the sun gear 16a. At reverse driving, the reverse brake 18 is engaged to lock the ring gear 16c for reversely rotating the carrier 16b.

The belt-drive transmission 5 has a main shaft 20 engaged with the carrier 16b and an output shaft 23 provided in parallel with the main shaft 20. A drive pulley (primary pulley) 22 and a driven pulley (secondary pulley) 25 are mounted on the main shaft 20 and output shaft 23, respectively. A fixed conical disc 22a of the drive pulley 22 is integral with main shaft 20 and an axially movable conical disc 22b is axially slidably mounted on the main shaft 20. The movable conical disc 22b also slides in a cylinder 21 formed on the main shaft 20 to provide a servo device.

A fixed conical disc 25a of the driven pulley 25 is formed on the output shaft 23 opposite the movable conical disc 22b and a movable conical disc 25b is slidably mounted on the shaft 23 opposite the disc 22a. Movable conical disc 25b has a cylindrical portion which is slidably engaged in a cylinder 24 of the output shaft 23 to form a servo device. A drive belt 26 engages with the drive pulley 22 and the driven pulley 25. The cylinder 21 of the drive pulley 22 is so designed that the pressure receiving area thereof is larger than that of the cylinder 24 of the driven pulley 25. Thus, the running diameter of the belt 26 on the pulleys is varied dependent on driving conditions.

Secured to the output shaft 23 is a drive gear 27a of the final reduction device 6 which engages with an intermediate reduction gear 27 on an intermediate shaft 28. An intermediate gear 29 on the shaft 28 engages with a final reduction gear 30. The rotation of the final reduction gear 30 is transmitted to axles 32 of vehicle driving wheels 33 through a differential 31.

In the transmission 5, a main oil pump 34 is provided for supplying a high pressure of oil to the transmission. The main shaft 20 has an axial passage in which a main oil pump driving shaft 35 connected to the crankshaft 2 is rotatably mounted. An auxiliary oil pump 36 for the torque converter device 3 is housed therein. An auxiliary pump drive shaft 37 is connected to the impeller 12a and is operatively connected with the converter cover 11.

Figure 2:
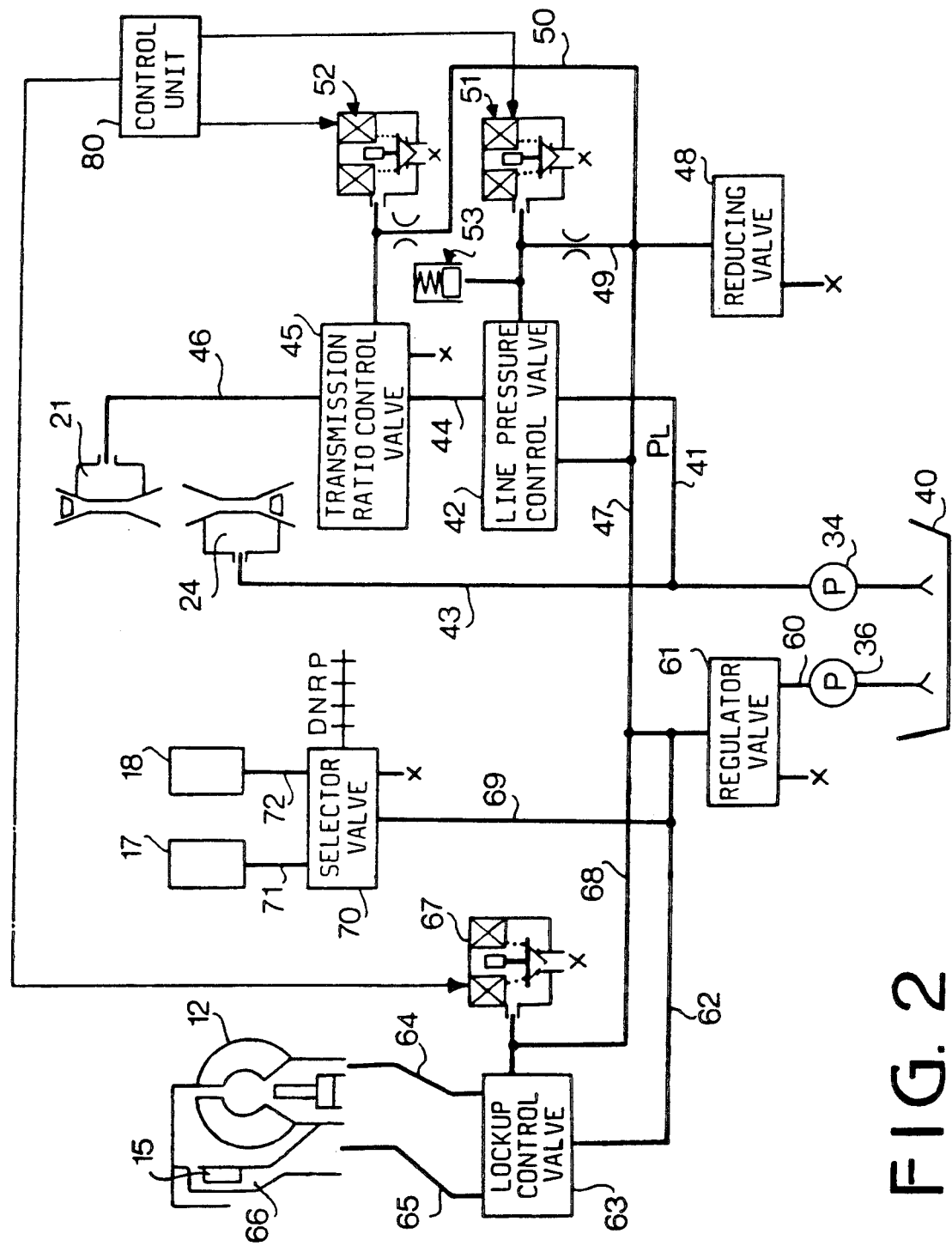
FIG. 2 shows a hydraulic control circuit for the transmission.

Referring to FIG. 2 showing a hydraulic control circuit, oil in an oil reservoir 40 is supplied to a line pressure control valve 42 through a line pressure passage 41 by the pump 34. An oil passage 43 connected to the passage 41 is communicated with the cylinder 24 of the driven pulley 25. The passage 41 is further communicated with a transmission ratio control valve 45 through a passage 44. The cylinder 21 of drive pulley 22 is applied with pressurized oil passing through the passage 41, line pressure control valve 42, passage 44, transmission ratio control valve 45, and a passage 46.

A passage 47 connected to the oil pump 36 is communicated with a reducing valve 48 for providing a constant reducing pressure of oil. A conduit 49 is communicated with the line pressure control valve 42, with a solenoid operated on-off valve 51 and with an accumulator 53. A conduit 50 is communicated with the transmission ratio control valve 45 and with a solenoid operated on-off valve 52.

The solenoid operated valve 51 is adapted to be operated by duty signals from a control unit 80 for producing control pressure in the form of pulses. The pulsation of the control pressure is smoothed by the accumulator 53 and the control pressure is applied to the line pressure control valve 42, so that the line pressure $P_L$ is controlled in accordance with the transmission ratio i, engine torque Te, and torque multiplication rate of the torque converter.

The solenoid operated valve 52 is also operated by duty signals and produces reducing pressure which is applied to the transmission ratio control valve 45 for shifting a spool of the valve 45 to an oil supply position and an oil drain position by the degree of duty ratio. Thus, the flow rate of oil supplied to or drained from the cylinder 21 of drive pulley 22 is controlled to provide optimum transmission ratio i.

A passage 60 from the oil pump 36 is communicated with a regulator valve 61 for producing a predetermined low pressure of oil. The regulator valve 61 is communicated with the lockup control valve 63 through a passage 62. The lockup control valve 63 is communicated with the torque converter 12 through a passage 64 and a release side oil chamber 66 of the lockup clutch 15 through a passage 65. The lockup control valve 63 is communicated with the reducing valve 48 through passage 68 for supplying with the reducing pressure. The reducing pressure is also supplied to a solenoid operated valve 67. The solenoid operated valve 67 operates the lockup control valve 63 by duty signals from the control unit 80 to communicate the passage 62 with the passage 64 or the passage 65.

When the lockup signal is not generated, the lockup control valve 63 operates to communicate the passage 62 with the passage 65 for supplying the pressure of oil to the torque converter 12 through the release side oil chamber 66. When the lockup signal is generated, the passage 62 is communicated with the passage 64 for pushing the lockup clutch 15 to the converter cover 11, which means locking of the torque converter.

The passage 62 is further communicated with a selector valve 70 through a passage 69. The selector valve 70 is communicated with the forward clutch 17 through a passage 71 and with the reverse brake 18 through a passage 72. The selector valve 70 is provided for selectively connecting passages in accordance with operations of a selector lever for selecting operational ranges such as a parking range (P), reverse range (R), neutral range (N), and drive range (D). In the D range selection, the selector valve 70 operates to communicate the passage 69 with the passage 71 for supplying the pressure of oil to the forward clutch 17. In the R range selection, the passage 69 is communicated with the passage 72 for supplying the pressure of oil to the reverse brake 18. In the P, N ranges selections, oil in the forward clutch 17 and the reverse brake 18 are drained.

Figure 3A:
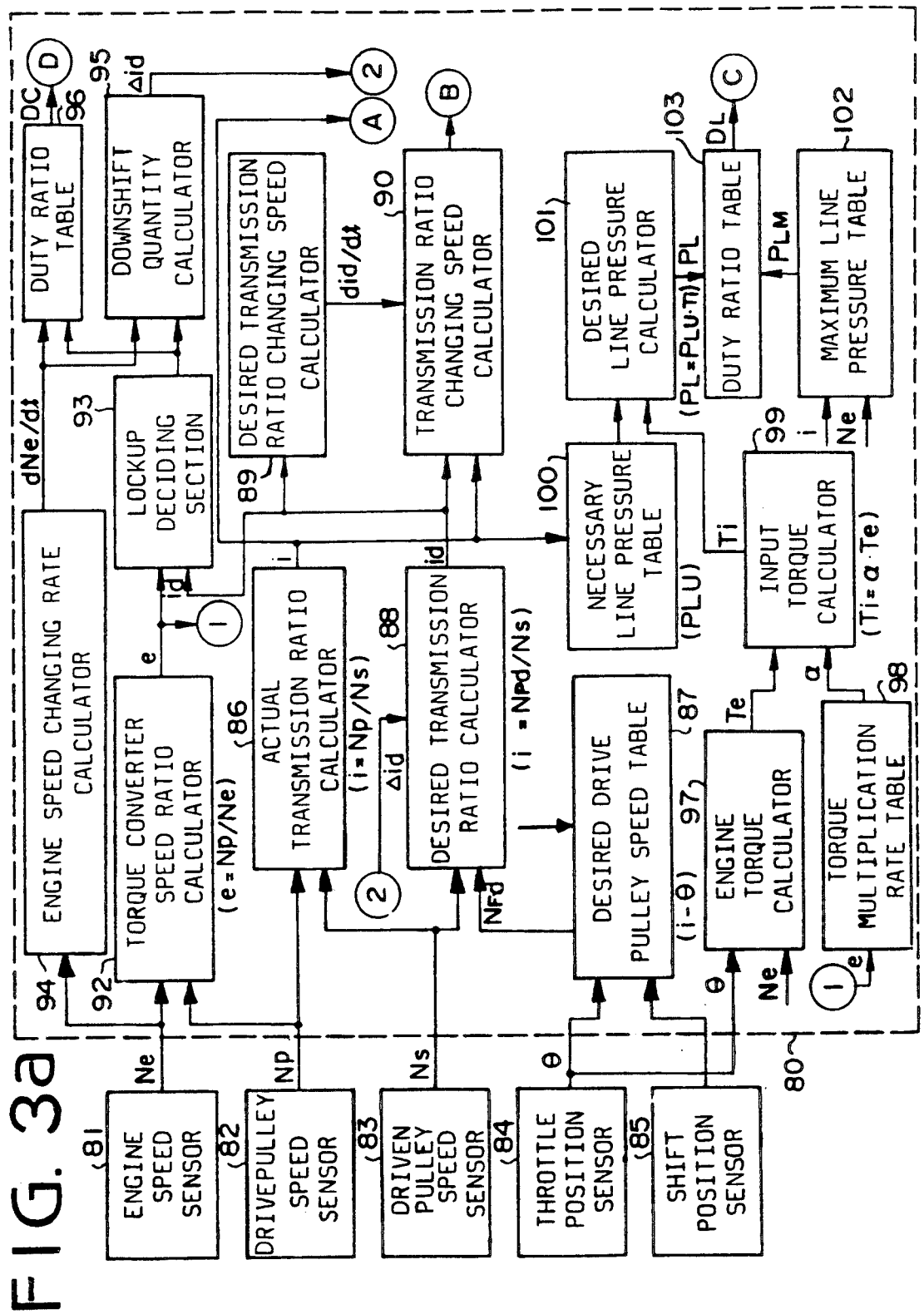
FIGS. 3a and 3b show a block diagram of a control unit of the present invention.
Figure 3B:
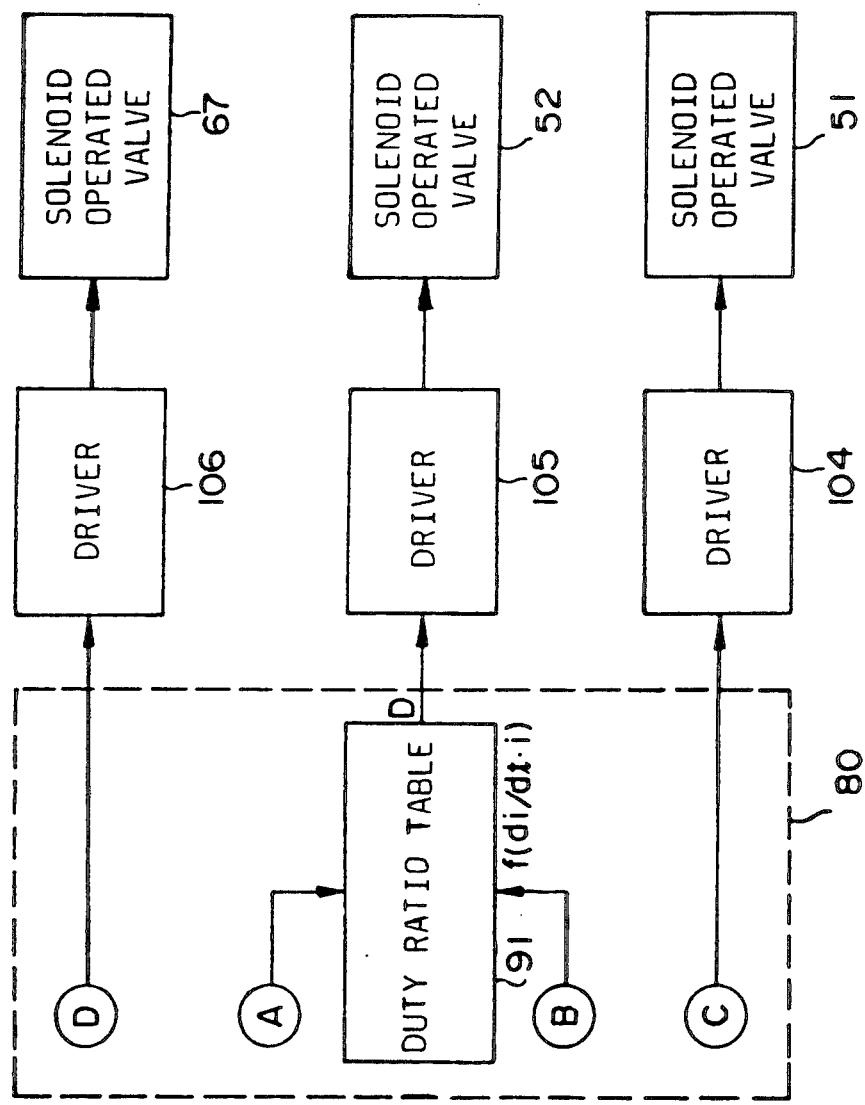

Referring to FIGS. 3a and 3b, the system is arranged to control the transmission ratio, the lockup clutch for the torque converter, and the line pressure. In the system, an engine speed sensor 81, a drive pulley speed sensor 82, a driven pulley speed sensor 83, a throttle position sensor 84, and a shift position sensor 85 are provided.

Output signals $N_P$ and $N_S$ of sensors 82, 83 are fed to an actual transmission ratio calculator 86 to produce an actual transmission ratio i in accordance with $i = N_P/N_S$. The actual transmission ratio i, output signal $\theta$ representing the opening degree of the throttle position sensor 84 and the output signal of the sensor 85 are fed to a desired drive pulley speed table 87 to derive a desired drive pulley speed Npd in accordance with values of the ratio i and the signal $\theta$. The desired drive pulley speed Npd and the output signal $N_S$ are fed to a desired transmission ratio calculator 88 to calculate a desired transmission ratio id in accordance with $id = Npd/N_S$.

The desired transmission ratio id is fed to a desired transmission ratio changing speed calculator 89 which produces a desired transmission ratio changing speed did/dt. The speed did/dt is the amount of change of the desired transmission ratio id during a predetermined time interval. The actual transmission ratio i, desired transmission ratio id, desired transmission ratio changing speed did/dt are applied to a transmission ratio changing speed calculator 90 to produce a transmission ratio changing speed di/dt from the formula as follows.

$$di/dt = K1(ed - i) + K2 \cdot did/dt$$

Where K1, K2 are coefficients, id−i is a controlling amount dependent on the difference between the desired and actual transmission ratios, and did/dt is a correction factor for the delay in operation of the system.

The speed di/dt and actual ratio i are applied to a duty ratio table 91 to derive a duty ratio D in accordance with D = f (di/dt, i) using a table at upshift and downshift of the transmission. The duty ratio D is supplied to the solenoid operated on-off valve 52 through a driver 105.

The engine speed signal Ne from the sensor 81 and the speed signal $N_P$ from the sensor 82 are applied drive pulley to a torque converter speed ratio calculator 92 to produce an actual torque converter speed ratio e between speeds of the input member and the output member in accordance with $e = N_P/Ne$.

The torque converter speed ratio e and the desired transmission ratio id are applied to a lockup deciding section 93 where the speed ratio e is compared with a reference speed ratio $e_s$ to determine whether it is in a converter operation state or in a zone to be coupled. The deciding section 93 further determines that the transmission starts to upshift when the desired ratio id is smaller than the largest transmission ratio 2.5 (id<2.5). A lockup-on signal is produced at starting of the transmission in the coupling zone, that is when $e \geq e_s$.

An engine speed changing rate calculator 94 to which the engine speed signal Ne is fed is provided to calculate an engine speed changing rate dNe/dt. The engine speed changing rate dNe/dt and the lock-up on signal are fed to a downshift quantity calculator 95. In the calculator 95, a drive pulley speed increasing quantity $\Delta N_P$, which represents an estimated drive pulley speed after a predetermined period of time t0 since the lockup-on signal is fed, is calculated as follows.

$$\Delta N_P = dNe/dt \cdot t0.$$

A downshift quantity $\Delta id$ corresponding to the increasing quantity $\Delta N_P$ is further calculated in accordance with the following equation.

$$\Delta id = \Delta N_P/N_S$$

The downshift quantity $\Delta id$ is applied to the desired transmission ratio calculator 88 and added to the desired transmission ratio id.

The engine speed changing rate dNe/dt and the lockup-on signal are further applied to a duty ratio table 96 to derive a duty ratio Dc corresponding to the changing rate. The duty ratio Dc is applied to the solenoid operated valve 67 through a driver 106.

Further, the throttle position signal $\theta$ and the engine speed signal Ne are fed to an engine torque calculator 97, so that engine torque Te is calculated based on throttle position $\theta$ and engine speed Ne. The speed ratio e is applied to a torque multiplication rate table 98 when the transmitting torque is varied in accordance with the increase of the torque of the torque converter. A torque multiplication rate $\alpha$ is derived from a table. The engine torque Te and the torque multiplication rate $\alpha$ are applied to an input torque calculator 99, so that an input torque Ti is calculated by $Ti = Te \cdot \alpha$.

On the other hand, the actual transmission ratio i from the calculator 86 is applied to a necessary line pressure table 100 to derive a necessary line pressure $P_{LU}$ per unit torque. The necessary line pressure $P_{LU}$ and the input torque Ti are applied to a desired line pressure calculator 101 where a desired line pressure $P_L$ is calculated by $P_L = P_{LU} \times Ti$.

In a hydraulic circuit of the control system, oil pressure discharged from the pump and applied to the line pressure control valve 42 varies in accordance with the change of the engine speed Ne, so that a maximum line pressure $P_{LM}$ also varies. In order to detect the variance of the maximum line pressure $P_{LM}$, the control unit is provided with a maximum line pressure table 102 to which the engine speed Ne and the actual transmission ratio i are supplied. Therefore, the maximum line pressure $P_{LM}$ is obtained.

The desired line pressure $P_L$ and the maximum line pressure $P_{LM}$ are applied to a duty ratio table 103 to derive a duty ratio $D_L$ corresponding to the desired line pressure $P_L$ and the maximum line pressure $P_{LM}$. The duty cycle $D_L$ is supplied to driver 104 which operates the solenoid operated on-off valve 51 at the duty ratio.

Operations of the system will be described hereinafter.

When the P or N range is selected at starting, oil in the forward clutch 17 and the reverse brake 18 are drained. Thus, the planetary gear 16 is released to disengage the transmission 5. At the same time, oil pumps 34 and 36 are driven by the oil pump driving shaft 35 and the converter cover 11 to supply pressurized oil to the line pressure control valve 42, regulator valve 61 and reducing valve 48. The line pressure is applied only to the cylinder 24 of the driven pulley 25 so that the drive belt 26 engages with the driven pulley 25 at a maximum running diameter to provide the largest transmission ratio (low speed stage). In this state, lockup deciding section 93 applies a lockup-off signal to the duty ratio table 96 so that the solenoid operated valve 67 is operated to apply the pressurized oil to release side chamber 66 of the lockup clutch 15. The oil is further supplied to the torque converter 12 so as to operate the converter 12.

When the D range is selected, the actuating pressure is applied to the forward clutch 17 to lock the planetary gear 16, so that the input shaft 13 is engaged with the main shaft 20. Thus, the torque converter 12 operates to transmit the power of the engine to the automatic transmission 5. The power of the engine is transmitted to the output shaft 23 at the largest transmission ratio by the drive belt 26 and pulleys 22, 25 and further transmitted to axles 32 of the driving wheels 33 through the final reduction device 6. Thus, the vehicle is started.

At the start of the vehicle, torque converter 12 multiplies the output torque of the engine at a small speed ratio e. The torque multiplication rate $\alpha$ is derived from the table 98 so as to increase the desired line pressure $P_L$. Thus, the line pressure controlled by the line pressure control valve 42 is increased in accordance with the maximum transmission ratio and engine torque thereby transmitting the torque multiplied by the torque converter without slipping of the belt 26.

After starting, when the driven pulley speed $N_S$ increases and the desired transmission ratio id calculated at the desired transmission ratio calculator 88 becomes id<2.5, the duty ratio table 91 produces the duty ratio signal D through the calculator 90. The transmission ratio control valve 45 is operated by solenoid valve 52, for controlling the pressure applied to the cylinder 21 of the drive pulley 22. Thus, the change of the transmission ratio is started.

Figure 4:
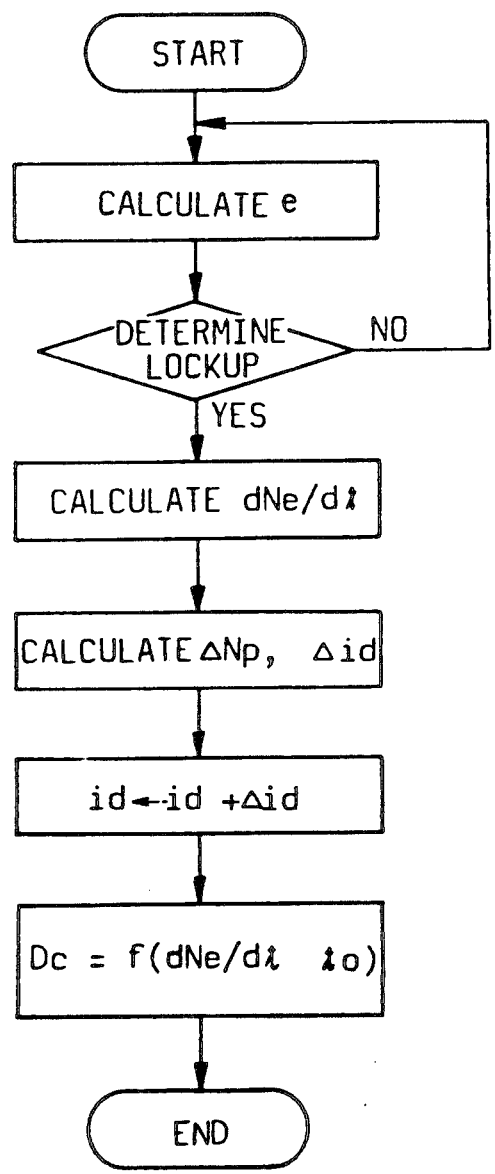
FIG. 4 is a flowchart showing the operation of the system of the present invention.
Figure 5A:
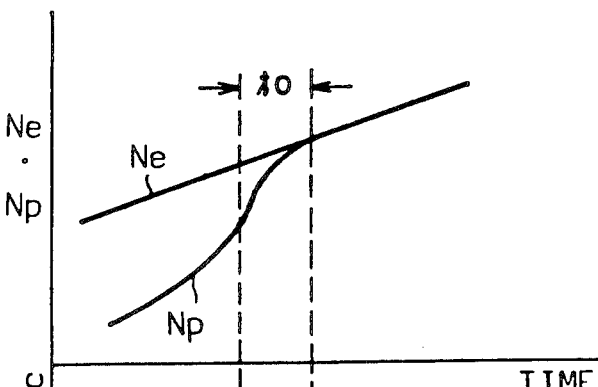
FIGS. 5a to 5d are timecharts showing engine speed and drive pulley speed, duty ratio of pulse signals for controlling a lockup clutch, transmission ratio and a lockup signal, respectively.
Figure 5B:
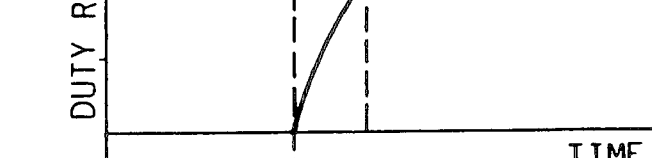
Figure 5C:
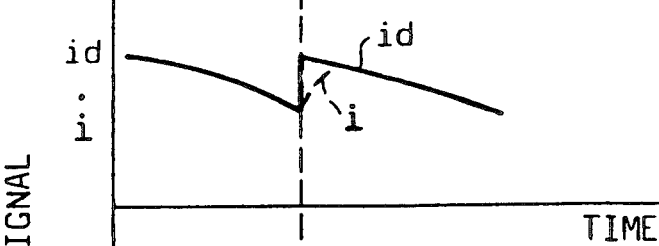
Figure 5D:
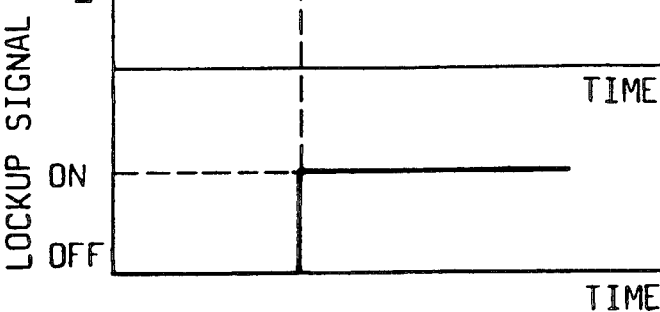

The operation shown in the flowchart of FIG. 4 is carried out thereafter. More particularly, the torque converter speed ratio e is calculated at the torque converter speed ratio calculator 92 and the engine speed changing rate dNe/dt which corresponds to the depressing degree of the accelerator pedal is calculated at the engine speed changing rate calculator 94. When the torque converter speed ratio e becomes larger than the reference speed ratio $e_s$ and the desired transmission ratio id is smaller than the largest transmission ratio, the coupling zone is determined. Thus, the lockup deciding section 93 produces the lockup-on signal. At the downshift quantity calculator 95, the drive pulley speed $N_P$ which will coincide with the engine speed Ne at the time t0 after the lockup-on signal is fed is estimated and the drive pulley speed increasing quantity $\Delta N_P$ based on the estimated drive pulley speed is calculated in dependency on the drive pulley speed $N_P$. The downshift quantity $\Delta$id corresponding to the drive pulley speed increasing quantity $\Delta N_P$ is calculated so that the desired transmission ratio id is corrected to downshift the transmission. Meanwhile the duty ratio Dc corresponding to the engine speed changing rate dNe/dt is retrieved from the duty ratio table 96 and applied to the solenoid valve 67. Hence the lockup control valve 68 is smoothly operated to gradually engaged the clutch 15.

In order to engage the lockup clutch 15, the lockup control valve 63 is operated to drain the oil in the release side chamber 66 through the passage 65 so that lockup clutch 15 is pushed by the oil pressure in the torque converter 12. Thus, the lockup clutch 15 comes in contact with the converter cover 11 to lock the crankshaft 2 and the lockup clutch 15, which means locking of the torque converter 12. Therefore, the engine power can be efficiently transmitted to the input shaft 13 through the lockup clutch 15.

The present invention may be modified to operate the lockup clutch 15 in accordance with the vehicle speed, engine speed Ne, transmission ratio or the torque converter speed ratio e. Furthermore, the engine speed changing rate may be controlled in dependency on the engine torque.

From the foregoing it will be understood that the present invention provides a system for controlling a continuously variable transmission having a torque converter wherein the transmission ratio and the lockup clutch are controlled to render the changing rate of the engine speed constant. Thus, the engine speed is prevented from suddenly changing at the lockup of the clutch, thereby restraining shock. The drive pulley speed of the continuously variable transmission gradually converges to the engine speed so that the difference between acceleration characteristics before and after the lockup of the clutch is reduced so that the clutch is smoothly coupled.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling a belt drive continuously variable transmission for transmitting power of an engine to wheels of a vehicle, the transmission having a belt running over a drive pulley and a driven pulley and a torque converter with a lockup clutch, the system having a hydraulic circuit including a transmission ratio control valve for changing transmission ratio of the transmission and a lockup clutch control valve for operating said lockup clutch, the system comprising:

lockup deciding means for deciding a lockup state of said lockup clutch in accordance with a condition of said torque converter and for producing a lockup signal indicative thereof;

engine speed changing rate calculating means responsive to said lockup signal for calculating an engine speed changing rate when said lockup signal is produced;

downshift quantity calculating means responsive to said lockup signal for estimating a speed changing quantity of said drive pulley in accordance with said engine speed changing rate and for calculating a downshift quantity of the transmission depending on said speed changing quantity of the drive pulley;

desired transmission ratio calculating means for calculating a desired transmission ratio in accordance with driving conditions of the vehicle and for correcting said desired transmission ratio with said downshift quantity; and actuating means for operating said lockup control valve to engage said lockup clutch in response to said lockup signal and for operating said transmission ratio control valve so as to downshift the transmission by said downshift quantity based on said desired transmission ratio corrected by said desired transmission ratio calculating means, whereby the speed of said drive pulley coincides with said engine speed while keeping said engine speed changing rate constant.

2. The system according to claim 1, wherein said lockup deciding means is adapted to produce said lockup signal when a ratio between input speed and output speed of said torque converter becomes larger than a reference speed ratio and said desired transmission ratio is smaller than the largest transmission ratio.

3. The system according to claim 1, wherein said actuating means comprises a first duty ratio table responsive to said engine speed changing rate for deriving a first duty ratio upon which said lockup control valve is operated.

4. The system according to claim 1 further comprising:

an engine speed sensor for sensing an engine speed;

a drive pulley speed sensor for sensing a drive pulley speed; and a driven pulley speed sensor for sensing a driven pulley speed.

5. The system according to claim 4, wherein said actuating means comprises:

actual transmission ratio calculating means responsive to said drive pulley speed and said driven pulley speed for calculating an actual transmission ratio;

desired transmission ratio changing speed calculating means responsive to said desired transmission ratio for calculating a desired transmission ratio changing speed;

transmission ratio changing speed calculating means responsive to said desired transmission ratio, said actual transmission ratio and said desired transmission ratio changing speed for calculating a transmission ratio changing speed; and a second duty ratio table responsive to said actual transmission ratio and said transmission ratio changing speed for deriving a second duty ratio upon which said transmission ratio control valve is operated to control the transmission ratio.

6. The system according to claim 4 having a throttle position sensor for sensing a throttle position and a shift position sensor for sensing a shift position of said transmission.

7. The system according to claim 6, further comprising:

desired drive pulley speed table responsive to said throttle position and said shift position for deriving a desired drive pulley speed, said desired transmission ratio calculating means being responsive to said driven pulley speed and said desired derive pulley speed.

* * * * *